United States Patent Office 3,541,809
Patented Nov. 24, 1970

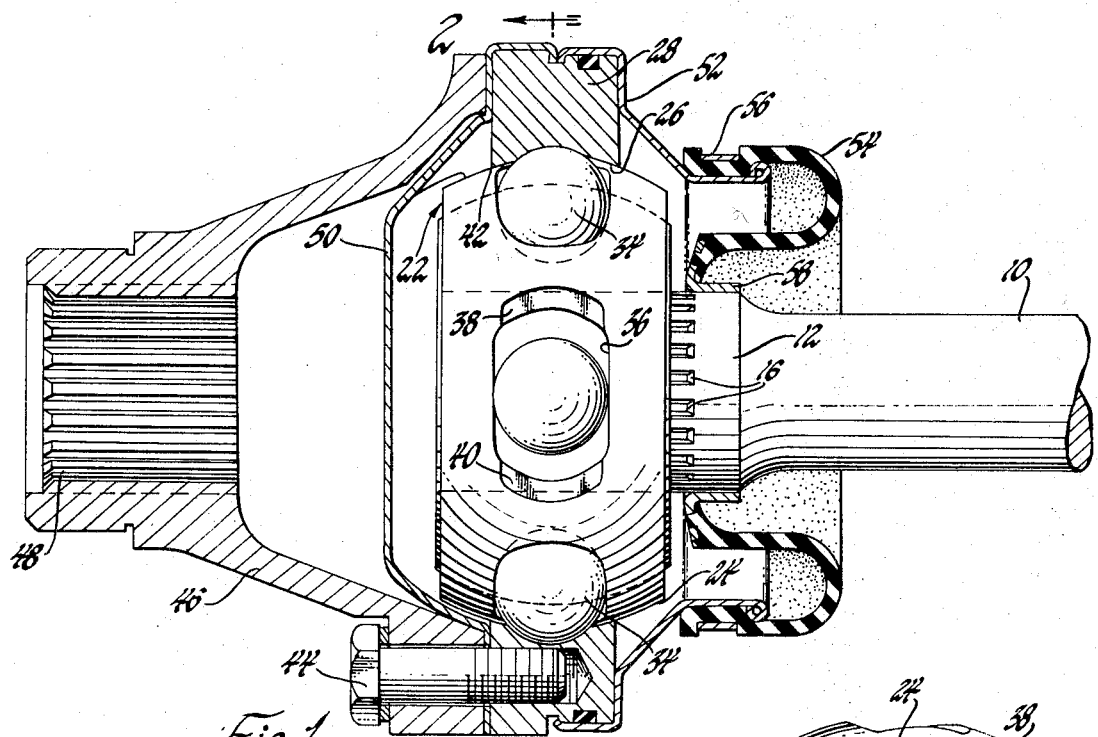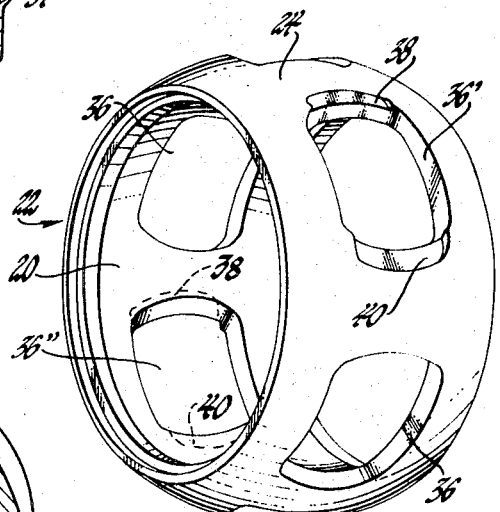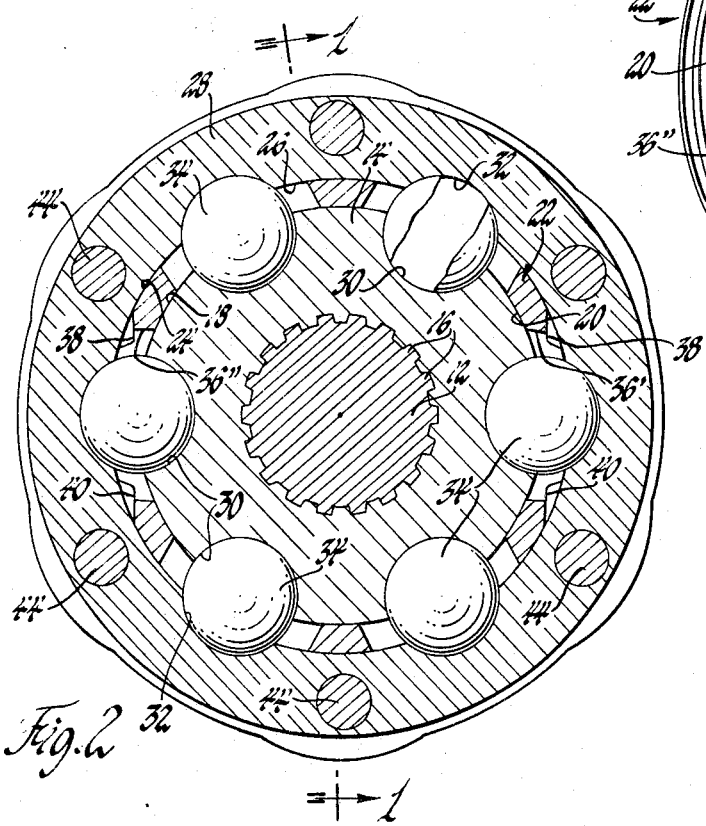

3,541,809
UNIVERSAL JOINT CAGE
Stanley G. Howey, Saginaw, Mich., assignor to General Motors Corporation, Detroit, Mich., a corporation of Delaware
Filed Mar. 6, 1969, Ser. No. 804,920
Int. Cl. F16d 3/34
U.S. Cl. 64—21                                       2 Claims

ABSTRACT OF THE DISCLOSURE

A universal joint cage with a series of openings for positioning balls has diametrically opposed flatted portions to reduce the outside diameter of the cage and permit the insertion of the cage into a spherical bore of a universal joint outer member. The flatted portions are adjacent the diametrically opposed openings to reduce the amount of material required to be removed to obtain sufficient flatting.

---

This invention relates to universal joints and more particularly to universal joints having cages for positioning balls between inner and outer joint members.

It is well known to provide universal joints with apertured cages to position the balls between the inner and outer members for the transmission of torque therebetween. Such universal joints have spaced spherical surfaces on the inner and outer members to permit angulation of the joints and the cage also must have spherical inner and outer surfaces. The edge openings of the outer member has a radius less than the spherical radius of the cage so that the cage cannot be axially inserted through the opening into the outer member and must be assembled in a different manner.

The most common manner of assembly is shown in Rzeppa 1,916,442. This requires enlarging diametrically opposed cage apertures to reduce the outside diameter of the cage through the enlarged apertures to slightly less than that of the edge opening of the outer member to allow the cage to be inserted at right angles through the outer member opening. After the center of the cage is co-incident with the center of the outer member, it is turned 90° to mate the spherical outer surface of the cage with the spherical inner surface of the outer member and hold the cage in position.

This manner of assembly reduces the areas of the webs between the enlarged apertures and their adjacent apertures. This invention, instead of enlarging the apertures, flattens the webs between diametrically opposed apertures and their adjacent apertures and thus does not reduce the areas of the webs therebetween.

Therefore, it is an object of this invention to provide a universal joint cage with substantially the same web area between all of the apertures. It is another object of this invention to provide a universal joint cage having diametrically opposed flatted portions which allow assembly of the cage into an outer joint member and yet provide substantially the same area between all of the apertures. It is a further object of this invention to provide a universal joint cage having flatted portions adjacent the sides of diametrically opposed apertures. These and other objects of the invention will become apparent from the following detailed description and drawings in which:

FIG. 2 is a partially broken away view of a universal joint having a cage according to this invention;
FIG. 1 is a partially broken away view of a universal lines 2—2 of FIG. 1;
FIG. 3 is a perspective view of the cage.

Referring now to FIG. 1, a shaft 10 has an enlarged end 12 which is conventionally secured to a universal joint inner member 14 by splines 16. Member 14 is conventionally retained on the shaft 10 by split rings, not shown. The member 14 has a spherical outer surface 18 which is embraced by the inner spherical surface 20 of a spherical cage member 22, thus mating the cage member 22 to the inner member 14. The cage member 22 has an outer spherical surface 24 which is in line contact or spaced slightly from the spherical inner surface 26 of an outer member 28.

The inner member 14 is provided with a multiplicity of circumferentially equally spaced grooves 30 in its outer surface 18. Similarly, the outer member 28 is provided with a like number of circumferentially equally spaced corresponding grooves 32 on its inner surface 26.

A torque transmitting ball 34 is positioned in each pair of corresponding grooves 30 and 32 to transmit torque between the members 14 and 28. The cage 22 is provided with a plurality of circumferentially spaced apertures 36, each receiving and positioning a ball 34 in the homokinetic plane. Each aperture has an axial width substantially equal to the diameter of the balls and a circumferential length greater than the diameter of the balls.

In order to insert the cage member 22 into the spherical inner portion 26 of the outer member 28, flattened portions 38 and 40 are provided on the spherical outer surface 24 of the cage 22 adjacent the circumferential edges of two diametrically opposed apertures 36' and 36". These flatted portions reduce the normal outside diameter of the cage 22 to a diameter slightly less than the diameter of the edge opening 42 of the outer member 28.

To assemble the joint, the inner member 14 is first slid into the cage 22 and the resultant unit is then positioned normal to the opening 42 of the outer member 28 with flatted portions 38 and 40 adjacent the edge of opening 42. The unit is then slid axially into the spherical inner bore 26 of the outer member 28 until all centers are coincident. The unit is then rotated 90° within the outer member 28 so that the spherical outer surface 24 of the cage member 22 engages the spherical inner bore 26 of the outer member 28 to hold the cage 22 in position.

The balls 34 are inserted into the joint by tipping the cage 22 and the inner member 14 to expose one aperture 36 at a time. As each aperture 36 is exposed, a ball 34 is placed therein and slid into mating grooves 30 and 32 and then cage member 22 and the inner member 14 are pivoted, exposing the next aperture 36. The process is repeated until the balls 34 are inserted in all of the apertures 36 and are slid into corresponding grooves 30 and 32.

The outer member 28 is bolted at 44 to coupling member 46 which is provided with a splined bore 48 for attachment to a shaft, not shown. An inner lubricant seal 50 and an outer shield 52 are attached to the outer member 28 by staking. A conventional rubber boot 54 is clamped by band 56 to shield 52. A retainer 58 secures the boot 54 to shaft 10 thus completing the universal joint.

While the flatted portions 38 and 40 remove a slight amount of material from the webs beween the four of the apertures, the amount of material removed does not materially reduce the cross sectional area of the webs between the apertures. Thus, the webs of the cage all have substantially the same area between the apertures.

I claim:
1. In a universal joint having an outer member provided with a spherical inner surface opening to an edge thereof, an inner member provided with a spherical outer surface, each member being provided with corresponding ball-receiving grooves, torque transmitting balls received within the grooves to connect the members, and an annular cage located between the members and having spherical inner and outer surfaces mating with the surfaces of the inner and outer members, the cage having a multi- plicity of ball-receiving circumferentially spaced openings for positioning the balls in the homo-kinetic plane, the improvement comprising flatted portions on the outer surface of the cage to reduce the overall diameter of the cage to slightly less than the diameter of the edge opening of the spherical inner surface of the outer member to enable the cage to be inserted into the outer member.

2. The universal joint as recited in claim 1 wherein the flatted portions are adjacent a pair of diametrically opposed openings.

References Cited

UNITED STATES PATENTS

| | | | |
|---|---|---|---|
| 1,524,161 | 1/1925 | Weiss | 64—21 XR |
| 1,665,280 | 4/1928 | Rzeppa | 64—21 XR |
| 1,916,442 | 7/1933 | Rzeppa | 64—21 |

JAMES A. WONG, Primary Examiner

PO-1050
(5/69)

UNITED STATES PATENT OFFICE
CERTIFICATE OF CORRECTION

Patent No. __3,541,809__  Dated __November 24, 1970__

Inventor(s) __Stanley G. Howey__

It is certified that error appears in the above-identified patent and that said Letters Patent are hereby corrected as shown below:

In the Specification:

Column 1, line 66, "FIG. 2" should be --FIG. 1--;

Column 1, delete lines 68 and 69 and insert therefor the following: --FIGURE 2 is a sectional view taken generally along the lines 2-2 of FIGURE 1;--.

SIGNED AND
SEALED
MAR 9 1971

(SEAL)
Attest:

Edward M. Fletcher, Jr.
Attesting Officer

WILLIAM E. SCHUYLER, JR.
Commissioner of Patents